(12) United States Patent
Holm et al.

(10) Patent No.: US 11,238,056 B2
(45) Date of Patent: Feb. 1, 2022

(54) ENHANCING SEARCH RESULTS WITH SOCIAL LABELS

(71) Applicant: Microsoft Technology Licensing, LLC, Redmond, WA (US)

(72) Inventors: Fredrik Holm, Oslo (NO); Dmitry Shaporenkov, Oslo (NO); Rune Djurhuus, Oslo (NO); Lucian Baciu, Oslo (NO); Tiago Duarte Pregueiro Jerónimo, Oslo (NO); Helge Grenager Solheim, Oslo (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 76 days.

(21) Appl. No.: 14/064,393

(22) Filed: Oct. 28, 2013

(65) Prior Publication Data
US 2015/0120700 A1    Apr. 30, 2015

(51) Int. Cl.
G06F 16/248 (2019.01)
G06F 16/904 (2019.01)

(52) U.S. Cl.
CPC .......... *G06F 16/248* (2019.01); *G06F 16/904* (2019.01)

(58) Field of Classification Search
CPC ......... G06F 17/30994; G06F 17/30554; G06F 16/904; G06F 16/248; G06F 16/9535; G06F 16/58; G06F 16/9024
See application file for complete search history.

(56) References Cited

U.S. PATENT DOCUMENTS

| | | |
|---|---|---|
| 6,434,556 B1 | 8/2002 | Levin et al. |
| 6,745,195 B1 | 6/2004 | Kornfein et al. |
| 7,031,961 B2 | 4/2006 | Pitkow et al. |
| 7,055,168 B1 | 5/2006 | Errico et al. |
| 7,143,091 B2 | 11/2006 | Charnock et al. |
| 7,444,344 B2 | 10/2008 | Galindo-Legaria et al. |
| 7,509,320 B2 | 3/2009 | Hess |
| 7,571,121 B2 | 8/2009 | Bezos et al. |
| 7,577,718 B2 | 8/2009 | Slawson et al. |

(Continued)

FOREIGN PATENT DOCUMENTS

| | | |
|---|---|---|
| CN | 1666279 A | 9/2005 |
| CN | 101398836 A | 4/2009 |

(Continued)

OTHER PUBLICATIONS

P. Resnick, Request for Comments (RFC) 5322, Oct. 2008, Network Working Group.*

(Continued)

*Primary Examiner* — Irete F Ehichioya
*Assistant Examiner* — Huen Wong
(74) *Attorney, Agent, or Firm* — Merchant & Gould P.C.

(57) ABSTRACT

Disclosed herein are systems, methods, and software for facilitating enhanced search services. In an implementation, an enhanced search service receives a search query associated with a user and responsively identifies documents relevant to the search query. The enhanced search service also identifies a social label for each of the documents that is at least partly representative of how the document relates socially to the user. The enhanced search service replies to the search query with search results indicative of at least the documents and the social label for each of the documents.

20 Claims, 6 Drawing Sheets

(56) References Cited

U.S. PATENT DOCUMENTS

| | | |
|---|---|---|
| 7,587,101 B1 * | 9/2009 | Bourdev .......... G06F 17/30268 382/291 |
| 7,640,236 B1 | 12/2009 | Pogue |
| 7,756,945 B1 * | 7/2010 | Andreessen ........ G06F 17/3089 709/203 |
| 7,761,447 B2 | 7/2010 | Brill et al. |
| 7,783,630 B1 | 8/2010 | Chevaller et al. |
| 7,788,245 B1 | 8/2010 | Eddings |
| 7,873,641 B2 | 1/2011 | Frieden et al. |
| 7,890,501 B2 | 2/2011 | Lunt et al. |
| 7,945,571 B2 | 5/2011 | Wanker |
| 7,958,116 B2 | 6/2011 | House et al. |
| 7,962,481 B2 | 6/2011 | Ganesh et al. |
| 8,005,817 B1 | 8/2011 | Amer-Yahia et al. |
| 8,060,513 B2 | 11/2011 | Basco et al. |
| 8,065,383 B2 | 11/2011 | Carlson et al. |
| 8,117,197 B1 | 2/2012 | Cramer |
| 8,204,870 B2 | 6/2012 | Mukkamala et al. |
| 8,204,888 B2 | 6/2012 | Frieden et al. |
| 8,209,349 B2 | 6/2012 | Howes et al. |
| 8,214,325 B2 | 7/2012 | Navas |
| 8,266,144 B2 | 9/2012 | Tankovich et al. |
| 8,301,764 B2 | 10/2012 | Konig et al. |
| 8,312,056 B1 | 11/2012 | Peng et al. |
| 8,341,017 B2 | 12/2012 | Payne et al. |
| 8,341,150 B1 | 12/2012 | Riley et al. |
| 8,346,765 B2 | 1/2013 | Guo et al. |
| 8,346,950 B1 * | 1/2013 | Andreessen ............ G06F 9/468 707/600 |
| 8,380,562 B2 | 2/2013 | Toebes et al. |
| 8,386,515 B2 | 2/2013 | Bent et al. |
| 8,463,795 B2 | 6/2013 | Van Hoff |
| 8,538,959 B2 | 9/2013 | Jin et al. |
| 8,548,996 B2 | 10/2013 | Tareen et al. |
| 8,572,477 B1 * | 10/2013 | Moskovitz ............ G06F 16/972 715/234 |
| 8,600,981 B1 | 12/2013 | Chau et al. |
| 8,601,023 B2 | 12/2013 | Brave et al. |
| 8,751,621 B2 | 6/2014 | Vaynblat et al. |
| 8,751,636 B2 | 6/2014 | Tseng et al. |
| 8,775,334 B1 | 7/2014 | Lloyd et al. |
| 8,782,036 B1 | 7/2014 | Chen et al. |
| 8,799,296 B2 | 8/2014 | Agapiev |
| 8,812,947 B1 | 8/2014 | Maoz et al. |
| 8,825,649 B2 | 9/2014 | Eimendinger et al. |
| 8,825,711 B2 | 9/2014 | Chan et al. |
| 8,874,550 B1 | 10/2014 | Soubramanien et al. |
| 8,886,633 B2 | 11/2014 | Smyth et al. |
| 8,898,156 B2 | 11/2014 | Xu et al. |
| 8,909,515 B2 | 12/2014 | O'Neil et al. |
| 8,984,098 B1 | 3/2015 | Tomkins et al. |
| 8,996,631 B1 | 3/2015 | Staddon et al. |
| 9,165,305 B1 | 10/2015 | Chandra et al. |
| 9,177,293 B1 * | 11/2015 | Gagnon ................ G06Q 10/107 |
| 9,195,679 B1 * | 11/2015 | Svendsen ................ G06Q 50/01 |
| 9,223,866 B2 | 12/2015 | Marcucci et al. |
| 9,438,619 B1 | 9/2016 | Chan et al. |
| 9,514,191 B2 | 12/2016 | Solheim et al. |
| 9,542,440 B2 | 1/2017 | Wang et al. |
| 9,576,007 B1 | 2/2017 | Sivathanu |
| 2001/0034859 A1 | 10/2001 | Swoboda et al. |
| 2002/0038299 A1 | 3/2002 | Zernik et al. |
| 2002/0091736 A1 * | 7/2002 | Wall .................. G06F 16/958 715/234 |
| 2002/0169759 A1 | 11/2002 | Kraft et al. |
| 2003/0025692 A1 | 2/2003 | Lu et al. |
| 2003/0071814 A1 | 4/2003 | Jou et al. |
| 2003/0115271 A1 * | 6/2003 | Weissman ............ G06Q 10/107 709/206 |
| 2004/0103088 A1 | 5/2004 | Cragun et al. |
| 2004/0255237 A1 | 12/2004 | Tong |
| 2004/0267736 A1 | 12/2004 | Yamane et al. |
| 2005/0076240 A1 * | 4/2005 | Appelman ............ H04L 51/12 726/4 |
| 2005/0076241 A1 * | 4/2005 | Appelman ............ H04L 51/12 726/4 |
| 2005/0201535 A1 * | 9/2005 | LaLonde ................ H04L 51/12 379/93.24 |
| 2005/0203929 A1 * | 9/2005 | Hazarika ............ G06F 17/3053 |
| 2005/0246420 A1 * | 11/2005 | Little, II ................ G06Q 10/107 709/204 |
| 2005/0278321 A1 | 12/2005 | Vailaya et al. |
| 2005/0278325 A1 | 12/2005 | Mihalcea et al. |
| 2006/0004892 A1 | 1/2006 | Lunt et al. |
| 2006/0074883 A1 | 4/2006 | Teevan et al. |
| 2006/0123014 A1 | 6/2006 | Ng |
| 2006/0168036 A1 * | 7/2006 | Schulz ................ G06Q 10/107 709/206 |
| 2006/0294085 A1 | 12/2006 | Rose et al. |
| 2007/0162443 A1 | 7/2007 | Liu et al. |
| 2007/0192306 A1 | 8/2007 | Papakonstantinou et al. |
| 2007/0208751 A1 * | 9/2007 | Cowan .................. G06Q 10/10 |
| 2008/0005064 A1 | 1/2008 | Sarukkai |
| 2008/0010337 A1 | 1/2008 | Hayes |
| 2008/0010350 A1 * | 1/2008 | Chen .................... G06Q 10/107 709/206 |
| 2008/0016053 A1 | 1/2008 | Frieden et al. |
| 2008/0086344 A1 | 4/2008 | Martini et al. |
| 2008/0091549 A1 | 4/2008 | Chang et al. |
| 2008/0097968 A1 * | 4/2008 | Delgado ............ G06F 17/30731 |
| 2009/0049053 A1 | 2/2009 | Barker et al. |
| 2009/0094233 A1 * | 4/2009 | Marvit ................ G06F 17/3071 |
| 2009/0125560 A1 * | 5/2009 | Munekuni ................ G06F 16/58 |
| 2009/0132490 A1 * | 5/2009 | Okraglik .................. H04L 51/22 |
| 2009/0132516 A1 | 5/2009 | Patel et al. |
| 2009/0150866 A1 | 6/2009 | Schmidt |
| 2009/0182727 A1 | 7/2009 | Majko |
| 2009/0256678 A1 * | 10/2009 | Ryu .................... G06K 9/00288 340/5.83 |
| 2009/0313295 A1 * | 12/2009 | Blaxland ............ G06F 17/30572 |
| 2009/0327271 A1 * | 12/2009 | Amitay ................ G06F 16/334 |
| 2010/0063878 A1 | 3/2010 | Bachet et al. |
| 2010/0082695 A1 | 4/2010 | Hardt |
| 2010/0083151 A1 | 4/2010 | Lanza et al. |
| 2010/0169320 A1 * | 7/2010 | Patnam ............ G06F 17/30696 707/737 |
| 2010/0169326 A1 | 7/2010 | Ma et al. |
| 2010/0179874 A1 | 7/2010 | Higgins et al. |
| 2010/0185610 A1 * | 7/2010 | Lunt .................. G06F 17/30864 707/727 |
| 2010/0223266 A1 | 9/2010 | Balmin et al. |
| 2010/0268703 A1 | 10/2010 | Buck |
| 2010/0306185 A1 * | 12/2010 | Smith .................... G06Q 10/107 707/709 |
| 2010/0332330 A1 | 12/2010 | Goel et al. |
| 2011/0004831 A1 | 1/2011 | Steinberg et al. |
| 2011/0040617 A1 | 2/2011 | Moonka et al. |
| 2011/0055241 A1 | 3/2011 | Lewis |
| 2011/0060803 A1 | 3/2011 | Barlin et al. |
| 2011/0087644 A1 | 4/2011 | Frieden et al. |
| 2011/0099167 A1 | 4/2011 | Galbreath et al. |
| 2011/0145275 A1 * | 6/2011 | Stewart .................. G06Q 10/10 707/769 |
| 2011/0145719 A1 * | 6/2011 | Chen .................... G06Q 10/10 715/739 |
| 2011/0153619 A1 | 6/2011 | Carter et al. |
| 2011/0214046 A1 | 9/2011 | Haberman et al. |
| 2011/0218946 A1 | 9/2011 | Stern et al. |
| 2011/0231381 A1 | 9/2011 | Mercuri |
| 2011/0264737 A1 | 10/2011 | Skinner |
| 2011/0271224 A1 | 11/2011 | Cruz Moreno et al. |
| 2012/0030169 A1 | 2/2012 | Allen et al. |
| 2012/0047114 A1 | 2/2012 | Duan et al. |
| 2012/0054303 A1 | 3/2012 | Priyadarshan et al. |
| 2012/0076367 A1 * | 3/2012 | Tseng .................... G06K 9/00288 382/118 |
| 2012/0078896 A1 | 3/2012 | Nixon et al. |
| 2012/0079004 A1 | 3/2012 | Herman |
| 2012/0084291 A1 * | 4/2012 | Chung .................. G06F 17/301 707/741 |
| 2012/0124041 A1 * | 5/2012 | Bawri .................... G06Q 10/107 707/728 |

(56) References Cited

U.S. PATENT DOCUMENTS

| | | |
|---|---|---|
| 2012/0158720 A1 | 6/2012 | Luan et al. |
| 2012/0158791 A1 | 6/2012 | Kasneci et al. |
| 2012/0209859 A1 | 8/2012 | Blount |
| 2012/0209878 A1 | 8/2012 | Park et al. |
| 2012/0210240 A1 | 8/2012 | Neystadt et al. |
| 2012/0215771 A1* | 8/2012 | Steiner ............... G06F 16/5854 707/723 |
| 2012/0215773 A1 | 8/2012 | Si et al. |
| 2012/0221558 A1 | 8/2012 | Byrne et al. |
| 2012/0221566 A1 | 8/2012 | Iwasa et al. |
| 2012/0239618 A1* | 9/2012 | Kung ................. G06F 21/6218 707/621 |
| 2012/0254790 A1 | 10/2012 | Colombino et al. |
| 2012/0271807 A1 | 10/2012 | Smyth et al. |
| 2012/0290399 A1 | 11/2012 | England et al. |
| 2012/0290637 A1 | 11/2012 | Perantatos et al. |
| 2012/0296918 A1 | 11/2012 | Morris et al. |
| 2012/0304215 A1 | 11/2012 | McCarthy et al. |
| 2012/0310922 A1* | 12/2012 | Johnson ............ G06F 17/30867 707/722 |
| 2012/0311139 A1 | 12/2012 | Brave et al. |
| 2012/0323998 A1 | 12/2012 | Schoen et al. |
| 2012/0324002 A1* | 12/2012 | Chen ................. G06F 17/30274 709/204 |
| 2012/0324027 A1 | 12/2012 | Vaynblat et al. |
| 2012/0330908 A1* | 12/2012 | Stowe ............... G06F 17/30955 707/693 |
| 2012/0330992 A1 | 12/2012 | Kanigsberg et al. |
| 2013/0006754 A1 | 1/2013 | Horvitz et al. |
| 2013/0013678 A1 | 1/2013 | Murthy |
| 2013/0031489 A1 | 1/2013 | Gubin et al. |
| 2013/0036230 A1 | 2/2013 | Bakos |
| 2013/0041896 A1 | 2/2013 | Ghani et al. |
| 2013/0054349 A1 | 2/2013 | Ogawa |
| 2013/0073280 A1 | 3/2013 | O'Neil et al. |
| 2013/0073568 A1 | 3/2013 | Federov et al. |
| 2013/0073632 A1 | 3/2013 | Fedorov et al. |
| 2013/0073979 A1 | 3/2013 | Shepherd et al. |
| 2013/0073983 A1 | 3/2013 | Rasmussen et al. |
| 2013/0080218 A1 | 3/2013 | Reapso |
| 2013/0086057 A1* | 4/2013 | Harrington ............. H04L 51/32 707/732 |
| 2013/0091149 A1 | 4/2013 | Dunn et al. |
| 2013/0097143 A1 | 4/2013 | Shenoy et al. |
| 2013/0097184 A1 | 4/2013 | Berkhin et al. |
| 2013/0103683 A1 | 4/2013 | Haveliwala et al. |
| 2013/0110638 A1 | 5/2013 | Ogawa |
| 2013/0110802 A1* | 5/2013 | Shenoy ............... G06F 17/30876 707/706 |
| 2013/0110827 A1* | 5/2013 | Nabar ................. G06F 17/30867 707/728 |
| 2013/0110978 A1 | 5/2013 | Gordon et al. |
| 2013/0124257 A1 | 5/2013 | Schubert |
| 2013/0124437 A1 | 5/2013 | Pennacchiotti et al. |
| 2013/0124613 A1 | 5/2013 | Plache et al. |
| 2013/0132138 A1 | 5/2013 | Doganata et al. |
| 2013/0151611 A1 | 6/2013 | Graham et al. |
| 2013/0155068 A1 | 6/2013 | Bier et al. |
| 2013/0159096 A1 | 6/2013 | Santhanagopal et al. |
| 2013/0167059 A1 | 6/2013 | Legris |
| 2013/0191416 A1* | 7/2013 | Lee .................. G06F 17/30979 707/771 |
| 2013/0204706 A1 | 8/2013 | Tang et al. |
| 2013/0212081 A1 | 8/2013 | Shenoy et al. |
| 2013/0218885 A1 | 8/2013 | Satyanarayanan |
| 2013/0218899 A1 | 8/2013 | Raghavan et al. |
| 2013/0227011 A1 | 8/2013 | Sharma et al. |
| 2013/0238449 A1 | 9/2013 | Ferreira et al. |
| 2013/0238587 A1* | 9/2013 | Annau ............... G06F 17/30666 707/708 |
| 2013/0238588 A1* | 9/2013 | Annau ............... G06F 17/30663 707/708 |
| 2013/0246404 A1* | 9/2013 | Annau ............... G06F 17/30672 707/723 |
| 2013/0246405 A1* | 9/2013 | Annau ............... G06F 17/30864 707/723 |
| 2013/0246521 A1 | 9/2013 | Schacht et al. |
| 2013/0262588 A1* | 10/2013 | Barak ..................... H04L 67/22 709/204 |
| 2013/0268973 A1 | 10/2013 | Archibong et al. |
| 2013/0288715 A1 | 10/2013 | Shieh et al. |
| 2013/0290323 A1* | 10/2013 | Saib ..................... G06F 16/113 707/728 |
| 2013/0298084 A1 | 11/2013 | Spivack et al. |
| 2013/0326369 A1 | 12/2013 | Buchanon |
| 2013/0332523 A1 | 12/2013 | Luu |
| 2013/0346329 A1 | 12/2013 | Alib-Bulatao et al. |
| 2014/0007860 A1 | 1/2014 | Lu |
| 2014/0013353 A1 | 1/2014 | Mathur |
| 2014/0032563 A1* | 1/2014 | Lassen ............... G06F 17/30315 707/741 |
| 2014/0040008 A1 | 2/2014 | Belani et al. |
| 2014/0040244 A1* | 2/2014 | Rubinstein ........ G06F 17/30528 707/722 |
| 2014/0040245 A1 | 2/2014 | Rubinstein et al. |
| 2014/0040246 A1 | 2/2014 | Rubinstein et al. |
| 2014/0040367 A1 | 2/2014 | Lessin et al. |
| 2014/0040370 A1 | 2/2014 | Buhr |
| 2014/0040729 A1 | 2/2014 | Marlow et al. |
| 2014/0041038 A1 | 2/2014 | Lessin et al. |
| 2014/0046982 A1 | 2/2014 | Chan et al. |
| 2014/0074602 A1 | 3/2014 | van Elsas et al. |
| 2014/0074856 A1 | 3/2014 | Rao |
| 2014/0074888 A1 | 3/2014 | Potter et al. |
| 2014/0074934 A1 | 3/2014 | van Hoff et al. |
| 2014/0089401 A1* | 3/2014 | Filev ................. G06F 17/30268 709/204 |
| 2014/0114986 A1 | 4/2014 | Bierner et al. |
| 2014/0156652 A1 | 6/2014 | Abiola |
| 2014/0164388 A1 | 6/2014 | Zhang |
| 2014/0173459 A1 | 6/2014 | Gaiser et al. |
| 2014/0181083 A1 | 6/2014 | Macho et al. |
| 2014/0181091 A1* | 6/2014 | Lassen .................. H04L 67/306 707/723 |
| 2014/0188899 A1 | 7/2014 | Whitnah et al. |
| 2014/0189530 A1 | 7/2014 | Anand et al. |
| 2014/0195605 A1 | 7/2014 | Kallayil |
| 2014/0195977 A1 | 7/2014 | Chang et al. |
| 2014/0207860 A1 | 7/2014 | Wang et al. |
| 2014/0208234 A1 | 7/2014 | Amit et al. |
| 2014/0215351 A1 | 7/2014 | Gansca et al. |
| 2014/0229293 A1 | 8/2014 | Huang et al. |
| 2014/0278986 A1* | 9/2014 | Rouse ................. G06Q 30/0256 705/14.54 |
| 2014/0280080 A1 | 9/2014 | Solheim et al. |
| 2014/0280108 A1 | 9/2014 | Dunn et al. |
| 2014/0282029 A1 | 9/2014 | Vishria |
| 2014/0324850 A1 | 10/2014 | Magnaghi et al. |
| 2014/0330551 A1 | 11/2014 | Bao et al. |
| 2014/0330809 A1 | 11/2014 | Raina et al. |
| 2014/0330818 A1* | 11/2014 | Raina ..................... G06Q 30/02 707/723 |
| 2014/0330819 A1* | 11/2014 | Raina ................. G06F 16/24565 707/723 |
| 2014/0337316 A1 | 11/2014 | Abuelsaad et al. |
| 2014/0344288 A1 | 11/2014 | Evans et al. |
| 2014/0359023 A1 | 12/2014 | Homsany |
| 2015/0039596 A1 | 2/2015 | Stewart |
| 2015/0039632 A1* | 2/2015 | Leppanen ............ G06K 9/6201 707/748 |
| 2015/0046515 A1 | 2/2015 | Pei et al. |
| 2015/0058758 A1 | 2/2015 | Tseng |
| 2015/0067505 A1 | 3/2015 | Metcalf et al. |
| 2015/0081449 A1 | 3/2015 | Ge et al. |
| 2015/0100644 A1* | 4/2015 | Gulik ..................... H04L 51/22 709/206 |
| 2015/0106191 A1 | 4/2015 | Ge et al. |
| 2015/0127677 A1 | 5/2015 | Wang et al. |
| 2015/0142785 A1 | 5/2015 | Roberts et al. |
| 2015/0187024 A1 | 7/2015 | Karatzoglou et al. |
| 2015/0220531 A1 | 8/2015 | Helvik et al. |
| 2015/0242402 A1 | 8/2015 | Holm et al. |

(56) References Cited

U.S. PATENT DOCUMENTS

| | | | |
|---|---|---|---|
| 2015/0242473 A1 | 8/2015 | Brugard et al. | |
| 2015/0248222 A1 | 9/2015 | Stickler et al. | |
| 2015/0248410 A1 | 9/2015 | Stickler et al. | |
| 2015/0248480 A1 | 9/2015 | Miller et al. | |
| 2015/0249715 A1 | 9/2015 | Helvik et al. | |
| 2015/0294138 A1* | 10/2015 | Barak | H04L 67/22 |
| | | | 382/118 |
| 2015/0363402 A1 | 12/2015 | Jackson et al. | |
| 2015/0363407 A1 | 12/2015 | Huynh et al. | |
| 2015/0379586 A1 | 12/2015 | Mooney et al. | |
| 2015/0381552 A1 | 12/2015 | Vijay et al. | |
| 2016/0034469 A1 | 2/2016 | Livingston et al. | |
| 2016/0070764 A1 | 3/2016 | Helvik et al. | |
| 2016/0117740 A1 | 4/2016 | Linden et al. | |
| 2016/0203510 A1 | 7/2016 | Pregueiro et al. | |
| 2017/0072002 A1 | 3/2017 | Bafundo et al. | |
| 2017/0091644 A1 | 3/2017 | Chung et al. | |
| 2017/0212931 A1 | 7/2017 | Chen et al. | |
| 2019/0180204 A1 | 6/2019 | Stickler et al. | |
| 2020/0358864 A1 | 11/2020 | Helvik et al. | |
| 2021/0056472 A1 | 2/2021 | Stickler et al. | |
| 2021/0232631 A1 | 7/2021 | Holm et al. | |
| 2021/0263917 A1 | 8/2021 | Helvik et al. | |

FOREIGN PATENT DOCUMENTS

| | | |
|---|---|---|
| CN | 102150161 A | 8/2011 |
| CN | 102298612 A | 12/2011 |
| CN | 102567326 A | 7/2012 |
| CN | 102693251 A | 9/2012 |
| CN | 102708168 A | 10/2012 |
| CN | 102906689 A | 1/2013 |
| CN | 102930035 A | 2/2013 |
| EP | 2409271 A2 | 1/2012 |
| EP | 2426634 A1 | 3/2012 |
| EP | 2764489 A1 | 8/2014 |
| WO | 2008097969 A2 | 8/2008 |
| WO | 2008/111087 A2 | 9/2008 |
| WO | 2010/029410 A1 | 3/2010 |
| WO | 2012129400 A2 | 9/2012 |
| WO | 2013/026095 A1 | 2/2013 |
| WO | 2013/043654 A2 | 3/2013 |
| WO | 2013/123550 A1 | 8/2013 |
| WO | 2013/173232 A1 | 11/2013 |

OTHER PUBLICATIONS

PCT International Preliminary Report on Patentability Issued in Application No. PCT/US2014/061658, dated May 12, 2016, 7 Pages.

PCT International Preliminary Report on Patentability Issued in Application No. PCT/US2016/012399, dated Jul. 11, 2017, 9 Pages.

"Bing Ads targeting—training", Published on: Mar. 31, 2013 Available at: http://advertise.bingads.microsoft.com/en-ca/cl/245/training/bing-ads-targeting.

"Campaign Element Template Parameters—Training", Retrieved on: Oct. 1, 2014 Available at: https://www-304.ibm.com/support/knowledgecenter/SSZLC2_7.0.0/com.ibm.commerce.management-center_customization.doc/concepts/csbcustargdef.htm.

"Connections Enterprise Content Edition", Published on: Nov. 22, 2013 Available at: http://www-03.ibm.com/software/products/en/connections-ecm/.

"Enterprise Search from Microsoft", Published on: Jan. 2007, Available at: https://www.google.co.in/url?sa=t&rct=j&q=&esrc=s&source=web&cd=2&cad=rja&ved=0CDMQFjAB&url=http%3A%2F%2Fdownload.microsoft.com%2Fdownload%2Fd%2F0%2F1%2Fd0165e6d-11cb-464b-b24a-c019d82def0d%2FEnterprise%2520Search%2520from%2520Microsoft.doc&ei=1Aq9UqueHoTtrAe5yoC4Bg&usg=AFQjCNEax9yYC0KGTUhr4bNIxTJpyyyhsA&bvm=bv.58187178,d.bmk.

"Facets for Enterprise Search Collections", Retrieved on: Jun. 17, 2014, Available at: http://pic.dhe.ibm.com/infocenter/analytic/v3r0m0/index.jsp2topic=%2Fcom.ibm.discovery.es.ad.doc%2Filysafacets.htm.

"Getting Started with your My Site", Published on: Apr. 6, 2013, Available at: http://office.microsoft.com/en-in/sharepoint-server-help/getting-started-with-your-my-site-HA101665444.aspx.

"How to Segment and Target Your Emails—Training", Published on: Aug. 15, 2014 Available at: http://www.marketo.com/_assets/uploads/How-to-Segment-and-Target-Your-Emails.pdf?20130828153321.

"Introducing Delve (codename Oslo) and the Office Graph", Published on: Mar. 11, 2014, Available at: http://blogs.office.com/2014/03/11/introducing-codename-oslo-and-the-office-graph/.

"Introduction to Managed Metadata", Retrieved on: Jun. 23, 2014 Available at: http://office.microsoft.com/en-001/office365-sharepoint-online-enterprise-help/introduction-to-managed-metadata-HA102832521.aspx.

"Persistent Search: Search's Next Big Battleground", Available at: http://billburnham.blogs.com/burnhamsbeat/2006/04/persistent_sear.html, Published on: Apr. 10, 2006, 3 pages.

"Turn search history off or on", retrieved from http://onlinehelp.microsoft.com/en-US/bing/ff808483.aspx, Retrieved date: Dec. 12, 2013, 1 page.

"Yammer the Enterprise Social Network", Published on: Sep. 9, 2013 Available at: https://about.yammer.com/product/feature-list/.

Amitay et al., "Social Search and Discovery using a Unified Approach", In Proceedings of the 20th ACM Conference on Hypertext and Hypermedia, Jun. 29, 2009, pp. 199-208.

Bailly, Nestor, "Finding the Best Video Content Using the Power of the Social Graph", Published on: Jul. 17, 2013 Available at: http://iq.intel.com/iq/35820000/finding-the-best-video-content-using-the-power-of-the-social-graph.

Bobadilla et al., "Recommender Systems Survey", In Journal of Knowledge-Based Systems, vol. 46, Jul. 2013, pp. 109-132.

Daly et al., "Social Lens: Personalization around user Defined Collections for Filtering Enterprise Message Streams", In Proceedings of the Fifth International AAAI Conference on Weblogs and Social Media, Published on: Jul. 17, 2011, 8 pages.

Diaz et al., "SIGIR 2013 Workshop on Time Aware Information Access (#TAIA2013)", In Proceedings of the 36th International ACM SIGIR Conference on Research and Development in Information Retrieval, Aug. 1, 2013, 41 pages.

Elbassuoni et al., "Language-Model-Based Ranking for Queries on RDF-Graphs", In Proceedings of the 18th ACM Conference on Information and Knowledge Management, Nov. 2, 2009, 10 pages.

Fan et al., "Tuning Before Feedback: Combining Ranking Discovery and Blind Feedback for Robust Retrieval", Retrieved at http://filebox.vt.edu/users/wfan/paper/ARRANGER/p52-Fan.pdf, 27th Annual International ACM SIGIR Conference on Research and Development in Information Retrieval, Jul. 25, 2004, 8 pages.

Fox, Vanessa, "Marketing in the Age of Google", John Wiley & Sons, Mar. 8, 2012, 3 pages.

Giugno et al., "GraphGrep: A Fast and Universal Method for Querying Graphs", In Proceedings of the 16th International Conference on Pattern Recognition, vol. 2, Aug. 11, 2002, 4 pages.

Gruhl et al., "The Web beyond Popularity—A Really Simple System for Web Scale RSS", In Proceedings of the 15th International Conference on World Wide Web, May 23, 2006, pp. 183-192.

Guy et al., "Finger on the Pulse: The Value of the Activity Stream in the Enterprise", In Proceedings of 14th IFIP TC 13 International Conference on Human-Computer Interaction, Sep. 2, 2013, 18 pages.

Guy et al., "Personalized Recommendation of Social Software Items Based on Social Relations", In Proceedings of the Third ACM Conference on Recommender Systems, Oct. 2009, pp. 53-60.

Hackett, Wes, "Extending the Activity Feed with Enterprise Content", In Proceedings of ActivityFeed, Development, Featured, Sharepoint, Social Features, Jun. 16, 2011, 27 pages.

Hanada, Tetsuya, "Yammer—Enterprise Graph SharePoint", In Australian Sharepoint Conference, Jun. 11, 2013, 23 pages.

(56) References Cited

OTHER PUBLICATIONS

Josh, "Send Notifications to your Customers in their Timezone—training", Published on: Aug. 19, 2014 Available at: https://mixpanel.com/blog/2014/08/19/announcement-send-notifications-in-your-customer-s-timezone.
Kelly et al., "The Effects of Topic Familiarity on Information Search Behavior", Retrieved at http://www.ils.unc.edu/~dianek/kelly-jcd102.pdf, Joint Conference on Digital Libraries, Portland, Oregon, USA, Jul. 13, 2002, 2 pages.
Khodaei et al., "Social-Textual Search and Ranking", In Proceedings of the First International Workshop on Crowdsourcing Web Search, Apr. 17, 2012, 6 pages.
Kubica et al., "cGraph: A Fast Graph-Based Method for Link Analysis and Queries", In Proceedings of the IJCAI Text-Mining & Link-Analysis Workshop, Aug. 2003, 10 pages.
Li et al., "Personalized Feed Recommendation Service for Social Networks", In IEEE 2nd International Conference on Social Computing, Aug. 20, 2010, 8 pages.
Li et al., "Research of Information Recommendation System Based on Reading Behavior ", In International Conference on Machine Learning and Cybernetics, vol. 3, Jul. 12, 2008, 6 pages.
Liang et al., "Highlighting in Information Visualization: A Survey", In Proceedings of 14th International Conference Information Visualisation, Jul. 26, 2010, pp. 79-85.
Masuch, Lukas, "Hack: Enterprise Knowledge Graph—One Graph to Connect them All", Published on: Mar. 28, 2014, Available at : http://www.managementexchange.com/hack/enterprise-knowledge-graph-one-graph-connect-them-all.
Pecovnik, Simon, "Enterprise Graph Search—take 1", Published on: Jan. 28, 2014, Available at: http://www.ravn.co.uk/2014/01/28/enterprise-graph-search/.
Perer et al., "Visual Social Network Analytics for Relationship Discovery in the Enterprise", In IEEE Conference on Visual Analytics Science and Technology, Published on: Oct. 23, 2011, 9 pages.
Ronen et al., "Social Networks and Discovery in the Enterprise (SaND)", In Proceedings of the 32nd International ACM SIGIR Conference on Research and Development in Information Retrieval, Jul. 19, 2009, 1 page.
Roth et al., "Suggesting Friends Using the Implicit Social Graph", In Proceedings of the 16th ACM SIGKDD International Conference on Knowledge Discovery and Data Mining, Jul. 25, 2010, 9 pages.
Soussi, Rania, "Querying and Extracting Heterogeneous Graphs from Structured Data and Unstrutured Content", In Doctoral Dissertation, Ecole Centrale Paris, Jun. 22, 2012, 208 pages (1 page Abstract).
Ubbesen, Christian, "Enterprise Graph Search", Published on: Jan. 28, 2013, Available at: http://www.findwise.com/blog/enterprise-graph-search/.
Yeung, Ken, "Yammer Unveils the Open Graph for the Enterprise, to Help make Business Apps More Social", Published on: Oct. 29, 2012, Available at: http://thenextweb.com/insider/2012/10/29/yammer-using-the-enterprise-graph/?utm_source=feedburner&utm_medium=feed&utm_campaign=Feed:+TheNextWeb+(The+Next+Web+All+Stories).
Zhibao et al., "EISI: An Extensible Security Enterprise Search System", In 2nd International Conference on Computer Science and Network Technology, Dec. 29, 2012, pp. 896-900.
Fazio, Stephanie, "How Social is Enterprise Search?", Published on: Mar. 14, 2012, Available at: http://blogs.opentext.com/vca/blog/1.11.647/article/1.26.2007/2012/3/14/How_Social_is_Enterprise_Search%3F.
Muralidharan, et al., "Social Annotations in Web Search", In Proceedings of the ACM Annual Conference on Human Factors in Computing Systems, May 5, 2012, 10 pages.
Yap, Jamie, "Graph Search Capabilities Offer Enterprise Benefits", Published on: Feb. 14, 2013, Available at: http://www.zdnet.com/graph-search-capabilities-offer-enterprise-benefits-7000011304/.
U.S. Appl. No. 13/802,734, Solheim, et al., "Visualizing Ranking Factors for Items in a Search Result List", filed Mar. 14, 2013.

Yong Yin at al., An improved Search Strategy for Even Degree Distribution Networks, Jul. 2013, Academy Publisher, vol. 8, No. 7, pp. 1558-1565 (Year: 2013).
Jason J. Jung, Understanding information propagation on online social tagging systems, Nov. 4, 2012, Springer Science+ Business Media, Edition or vol. 48, pp. 745-754 (Year: 2012).
Barbie E. Keiser, Semisocial information Discovery, Novi Dec. 2013, Online searcher, pp. 16-22 (Year: 2013).
Anthony Stefanidis et al., Harvesting ambient geospatial information from social media feeds, Dec. 4, 2011, GeoJournal, Edition or vol. 78, pp. 319-338 (Year: 2011).
Chinese Office Action in Application 2014800588740 dated Dec. 5, 2018, 14pgs.
"International Search Report & Written Opinion Issued in PCT Patent Application No. PCT/US2014/061658", dated Jan. 9, 2015, 8 Pages.
"Non Final Office Action Issued in U.S. Appl. No. 14/192,235", dated Dec. 26, 2018, 16 Pages.
"Final Office Action Issued in U.S. Appl. No. 14/593,650", dated Jan. 4, 2019, 35 Pages.
"8 Things Marketers Ought to Know About Facebooks New Trending Feature", Retrieved from: https://web.archive.org/save/https://www.facebook.com/notes/brandlogist/8-things-marketers-ought-to-know-about-facebooks-new-trending-feature/650859898308191/, Jan. 30, 2014, 5 Pages.
"Trending—Definition and Synonyms", Retrieved from: https://web.archive.org/web/20170618063522/http://www.macmillandictionary.com:80/us/dictionary/american/trending, Jul. 18, 2014, 1 Page.
Dayal, Priyanka, "How Many Tweets Make a Trend?", Retrieved from https://www.vuelio.com/uk/blog/how-many-tweets-make-a-trend/, Aug. 28, 2013, 5 Pages.
"Final Office Action Issued in U.S. Appl. No. 14/194,700", dated May 20, 2019, 25 Pages.
"Notice of Allowance Issued in U.S. Appl. No. 14/195,243", dated May 1, 2019, 10 Pages.
"Final Office Action Issued in U.S. Appl. No. 14/296,747", dated May 1, 2019, 30 Pages.
Bakhshandeh, et al., "Personalized Search Based on Micro-Blogging Social Networks", In Proceedings of the CSI International Symposium on Artificial Intelligence and Signal Processing, May 2, 2012, 4 Pages.
Mishra, et al., "Improving Mobile Search through Location Based Context and Personalization", In Proceedings of the International Conference on Communication Systems and Network Technologies, May 11, 2012, 5 Pages.
"Office Action Issued in European Patent Application No. 15771764.6", dated May 13, 2019, 9 Pages.
"Final Office Action Issued in U.S. Appl. No. 14/192,235", dated Jul. 25, 2019, 14 Pages.
"Second Office Action Issued in Chinese Patent Application No. 201580011895.1", dated Aug. 9, 2019, 6 Pages.
"Final Office Action Issued in U.S. Appl. No. 15/833,453", dated May 4, 2020, 30 Pages.
"Office Action Issued in Mexican Patent Application No. MX/a/2017/002699", dated Feb. 14, 2020, 7 Pages.
"Office Action Issued in Chinese Patent Application No. 201580047507.5", dated Apr. 3, 2020, 13 Pages.
"Final Office Action Issued in U.S. Appl. No. 14/296,747", dated Sep. 3, 2020, 31 Pages.
"Non Final Office Action Issued in U.S. Appl. No. 15/833,453", dated Sep. 11, 2020, 36 Pages.
Pradel, et al., "Natural Language Query Interpretation into SPARQL using Patterns", Retrieved From: https://hal.archives-ouvertes.fr/hal-01143219/document, Oct. 22, 2013, 14 Pages.
Brinkley, et al., "A Query Integrator and Manager for the Query Web", In Journal of Biomedical Informatics, vol. 15, Issue 5, Oct. 1, 2012, pp. 975-991.
"Non Final Office Action Issued in U.S. Appl. No. 16/057,229", dated Jun. 9, 2020, 8 Pages.
"First Examination Report Issued in Indian Patent Application No. 201647027554", dated Sep. 14, 2020, 6 Pages.
"Second Office Action Issued in Chinese Patent Application No. 201580010703.5", dated Oct. 24, 2019, 5 Pages.

(56) References Cited

OTHER PUBLICATIONS

"Office Action Issued in Chinese Patent Application No. 201580047507.5", dated Sep. 28, 2020, 14 Pages.
"Non Final Office Action Issued in U.S. Appl. No. 14/194,700", dated Nov. 5, 2019, 27 Pages.
"Non Final Office Action Issued in U.S. Appl. No. 15/833,453", dated Dec. 17, 2019, 42 Pages.
"Notice of Allowance Issued in U.S. Appl. No. 14/194,700", dated Apr. 15, 2020, 9 Pages.
"Non Final Office Action Issued in U.S. Appl. No. 14/192,235", dated Apr. 17, 2020, 16 Pages.
"First Office Action and Search Report Issued in Chinese Patent Application No. 201580011895.1", dated Mar. 5, 2019, 18 Pages.
"Office Action Issued in European Patent Application No. 15710632.9", dated Feb. 18, 2019, 07 Pages.
"First Office Action and Search Report Issued in Chinese Patent Application No. 201580010703.5", dated Mar. 8, 2019, 12 Pages.
"Second Office Action and Search Report Issued in Chinese Patent Application No. 201480058874.0", dated Jun. 26, 2019, 14 Pages.
"Non Final Office Action Issued in U.S. Appl. No. 16/275,386", dated Aug. 29, 2019, 36 Pages.
"Non Final Office Action Issued in U.S. Appl. No. 14/296,747", dated Jan. 30, 2020, 32 Pages.
"Notice of Allowance Issued in U.S. Appl. No. 16/275,386", dated Mar. 6, 2020, 10 Pages.
Oyama, et al., "Analysis of Topics and Relevant Documents for Navigational Retrieval on the Web", In Proceedings of International Workshop on Challenges in Web Information Retrieval and Integration, Apr. 8, 2005, 6 Pages.
Chen, et al., "Towards Topic Trend Prediction on a Topic Evolution Model with Social Connection", In Proceedings of ACM International Conferences on Web Intelligence and Intelligent Agent Technology, Dec. 4, 2012, 5 Pages.
"Final Office Action Issued in U.S. Appl. No. 14/192,235", dated Nov. 18, 2020, 17 Pages.
"Non Final Office Action Issued in U.S. Appl. No. 14/296,747", dated Jan. 4, 2021, 30 Pages.
"Office Action Issued in Chinese Patent Application No. 201580047507.5," dated Jan. 11, 2021, 11 Pages.
"Notice of Allowance Issued in U.S. Appl. No. 16/895,056", dated Aug. 5, 2021, 11 Pages.
Aiello, et al., "Sensing Trending Topics in Twitter", In Journal of IEEE Transactions on Multimedia, vol. 15, Issue 6, Oct. 1, 2013, pp. 1268-1282.
Kim, et al., "Evolution of Social Networks Based on Tagging Practices", In Journal of IEEE Computer Society, vol. 6, Issue 2, Apr. 1, 2013, pp. 252-261.
"Non Final Office Action Issued in U.S. Appl. No. 14/192,235", dated Aug. 20, 2021, 17 Pages.
"Final Office Action Issued in U.S. Appl. No. 14/296,747", dated Sep. 10, 2021, 31 Pages.
Pang, et al., "Association-Based Recommendation of Web Information", In Proceedings of International Conference on Systems, Man and Cybernetics, vol. 7, Oct. 6, 2002, 5 Pages.
Tran, et al., "User Interest Analysis with Hidden Topic in News Recommendation System", In Proceedings of International Conference on Asian Language Processing, Dec. 28, 2010, 4 Pages.
"Notice of Allowance Issued in U.S. Appl. No. 16/895,056", dated Sep. 20, 2021, 11 Pages.

* cited by examiner

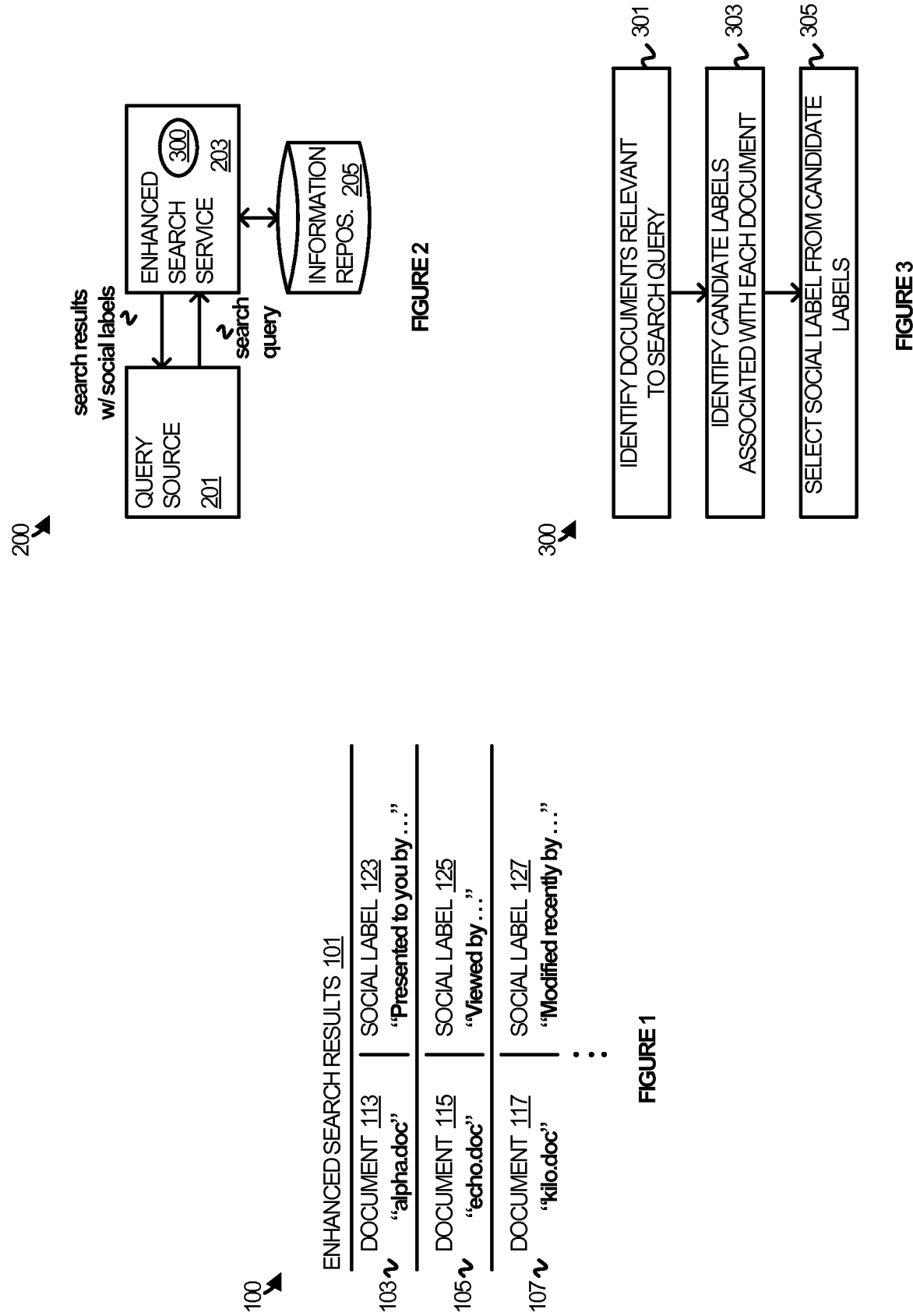

ENHANCING SEARCH RESULTS WITH SOCIAL LABELS

TECHNICAL FIELD

Aspects of the disclosure are related to computing hardware and software technology, and in particular to search technology and enhanced search services.

TECHNICAL BACKGROUND

Information search services have become ubiquitous in the modern information technology landscape. Through these services, users are able to access a large volume of information in many different ways, ranging from performing general Internet searches to more individual searches of their desktop, mailbox, photos, documents, or other personal information. Users can engage with such services using desktop and laptop computers, tablets, smart phones, gaming devices, or any of a variety of other suitable appliances.

A wide variety of algorithms are employed to find search results that are relevant to a query. The search results are usually ranked in some order related to their relevance to a query. However, why a particular search result is ranked as it is, may not always be apparent to a user. Moreover, as the volume and variety of searchable information expands, it has become increasingly important that search results be presented in a more useful way. Some search services have addressed this concern by accentuating their results and rankings with other information, of which a user's social graph is a prominent example.

A social graph is a data structure that includes information representative of a set of people and their social connections. Social graphs generally include nodes representative of people and edges representative of the connections between them. Other types of nodes can be represented in a social graph, such as documents, projects, and web pages. When a search of a data repository is performed, the search results can be accentuated by taking into account a user's social graph.

In a brief illustration, a user may perform a search of a document repository that returns a set of documents related to a topic. The search results can be accentuated by searching the user's social graph for experts associated with the topic and returning relevant contacts along with the relevant documents for presentation to the user.

In another illustration, a user may perform a web search for a given topic. The search results can be accentuated by showing related endorsements by others in the user's social network. For instance, the user may search for a particular type of restaurant, in response to which a list of restaurants or links to their sites are returned, along with an indication of who in the user's social network "liked" each of the restaurants.

OVERVIEW

Provided herein are systems, methods, and software for facilitating enhanced search services. In an implementation, an enhanced search service receives a search query associated with a user and responsively identifies documents relevant to the search query. The enhanced search service also identifies a social label for each of the documents that is at least partly representative of how the document relates socially to the user. In some implementations, the social label for each document may be selected from a set of candidate labels based on an evaluation of each of the candidate labels. The enhanced search service replies to the search query with search results indicative of at least the documents and the social label for each of the documents.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 1 illustrates a visualization of enhanced search results returned by an enhanced search service in an implementation.

FIG. 2 illustrates an operational scenario involving an enhanced search service in an implementation.

FIG. 3 illustrates a social label process employed by an enhanced search service in an implementation.

TECHNICAL DISCLOSURE

Figure 4:
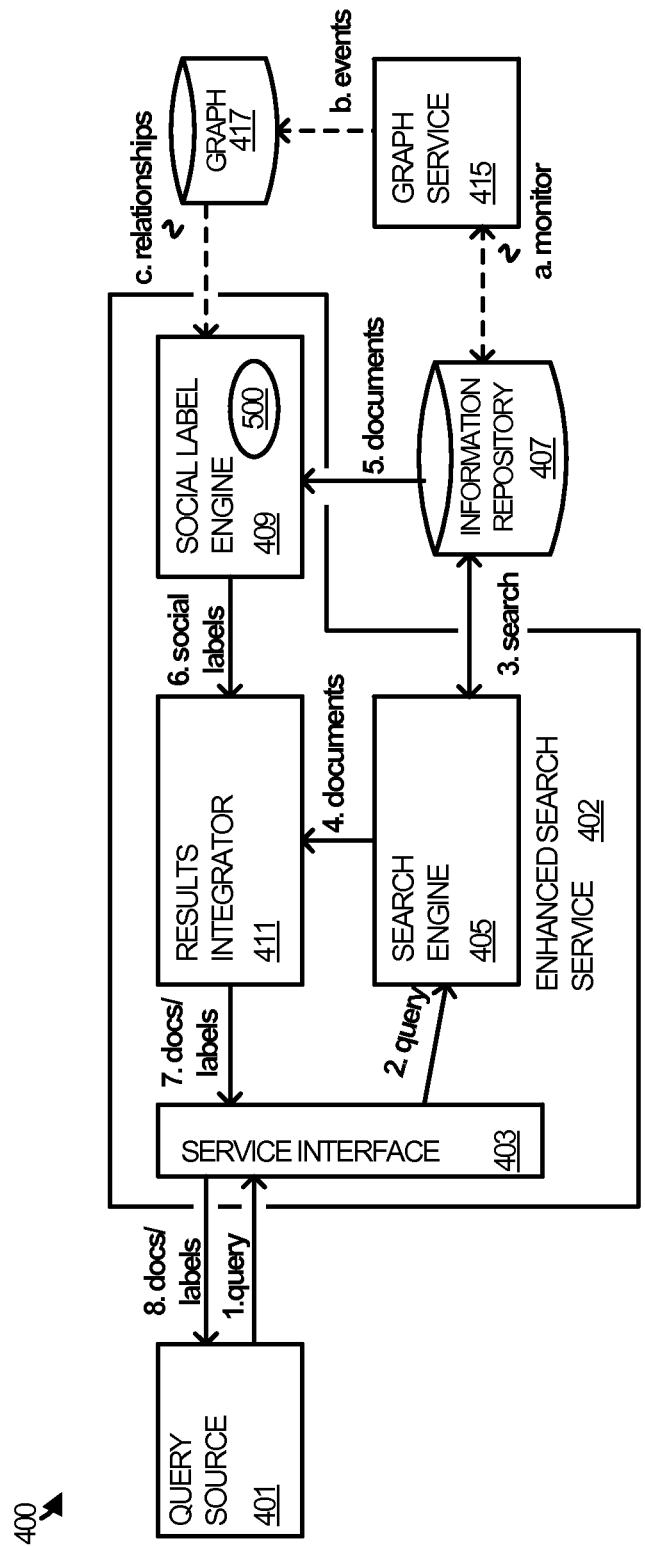
FIG. 4 illustrates an operational scenario in an implementation.

Implementations disclosed herein are directed to social labeling for search results that describes at least one way in which each result is related to a user. In one implementation, such social labeling is supported by an enhanced search service that receives a search query associated with a user. The enhanced search service identifies a set of documents or other types of content in response to the search query. For each document of the set of documents, the enhanced search service identifies a social label that is representative of how the document relates socially to the user. Search results can then be returned to the source of the search that are indicative of the set of documents and the social label for each document.

In a brief illustration, a user may engage in a search by way of any of a variety of search sources. A search query is communicated to an enhanced search service, in response to which the service performs a search of a data repository to identify relevant results, such as a set of documents, web pages, contacts, emails, conversations, meeting invites, or other suitable items.

In addition, the enhanced search service identifies a social label for each item that may express how the item is related to the user. For instance, the social label for any given item may indicate how the user relates to the item. In some scenarios, the relationship between an item and the user is expressed by the social label in terms of another user or users associated with the user. As an example, a social label associated with a document in a set of results may identify a user that recently viewed, modified, or presented the document.

In some implementations, the social label for each item may be selected from a set of potential candidate labels. Selecting the social label from the candidate labels may involve identifying the relationships between the item and users related to the user, such as those in the user's social network, work colleagues, team members, or by some other association. For instance, for a given document, web page, photo, contact, or other item, the enhanced search service analyzes which users have viewed, modified, presented, or otherwise interacted with the item.

Each relationship that is discovered for an item in the search results is then compared to the candidate labels to identify which of the candidate labels relates to, or represents the relationship. It is thus possible for multiple relationships to exist that describe how a given item relates to a user. This may be the case when, for example, multiple other users have interacted with a document or other item, when an individual user has interacted in multiple ways with a given item, or for some other reasons.

Each of the candidate labels can be evaluated based on the relationship or relationships associated therewith to identify which of the candidate labels to use as the social label for a given item. For instance, each candidate label may be scored based on at least a representative trait that is shared in common by each of the candidate labels. The trait may be derived at least in part from a characteristic of each of those of the relationships that relate to each of the candidate labels. Examples of the trait include, but are not limited to, a freshness of each of the candidate labels or a popularity of each of the candidate labels. In still other examples, the strength of a relationship may be considered when evaluating each of the candidate labels. The strength of the relationship may in some situations pertain to how strong the social link is between a person involved in a relationship and the person on behalf of whom a search is being performed. For instance, one candidate label representative how one's boss relates to a document may be chosen as the social label for the document over another candidate label representative of how one's peer or direct report relates to the document. In another scenario, one candidate label representative how one's sibling relates to a document may be chosen as the social label for the document over another candidate label representative of how one's cousin or neighbor relates to the document.

In some implementations, a graph may be queried to identify the relationships between an item, such as a document, and various users. The graph may include nodes representative of documents and possibly other types of items, as well as nodes representative of various users. Edges in the graph may be representative of actions taken by the users with respect to the documents and other items. The relationships considered when selecting the social label for a given result may be representative of the actions taken with respect to each individual document or other items. Thus, relationships between users and search results can be determined by analyzing the nature of the edges connecting search results in the graph to specific users. Examples of possible actions include, but are not limited to, presenting, sharing, creating, modifying, commenting on, viewing, following, and liking a document that is included in a set of search results.

The candidate labels in some scenarios correspond to the various possible actions performed by the users. In such scenarios, the social label identified for the document or other items includes social information that represents at least in part how the document relates socially to the user associated with the search. The social information may describe the relationship in terms of an action taken with respect to the document by at least one various other users related to the user. Examples of the candidate labels include a presented-by label, a shared-by label, a created-by label, a modified-by label, a commented-on-by label, a viewed-by label, a followed-by label, and a liked-by label.

Figure 5:
FIG. 5 illustrates a social label process employed by an enhanced search service in an implementation.
Figure 6:
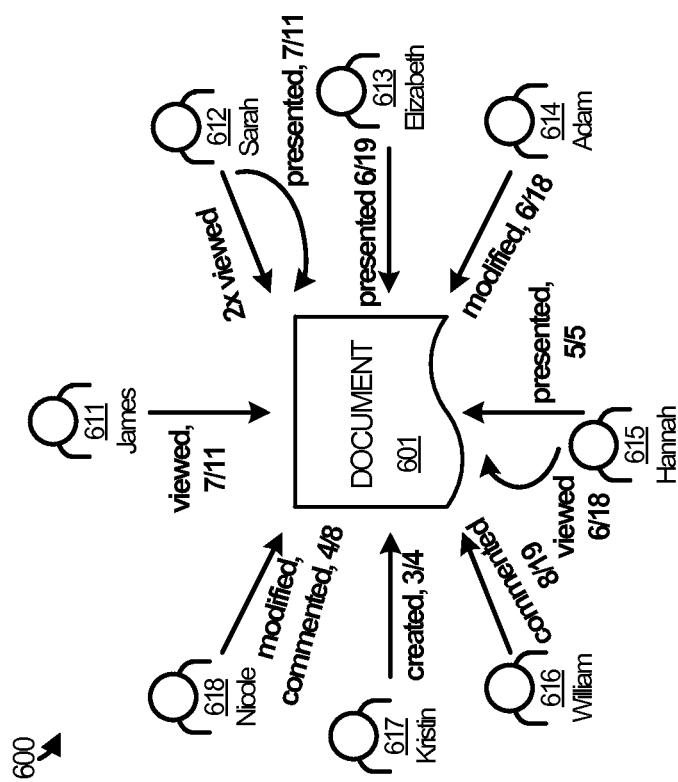
FIG. 6 illustrates a visualization of relationships in an implementation.
Figure 7:
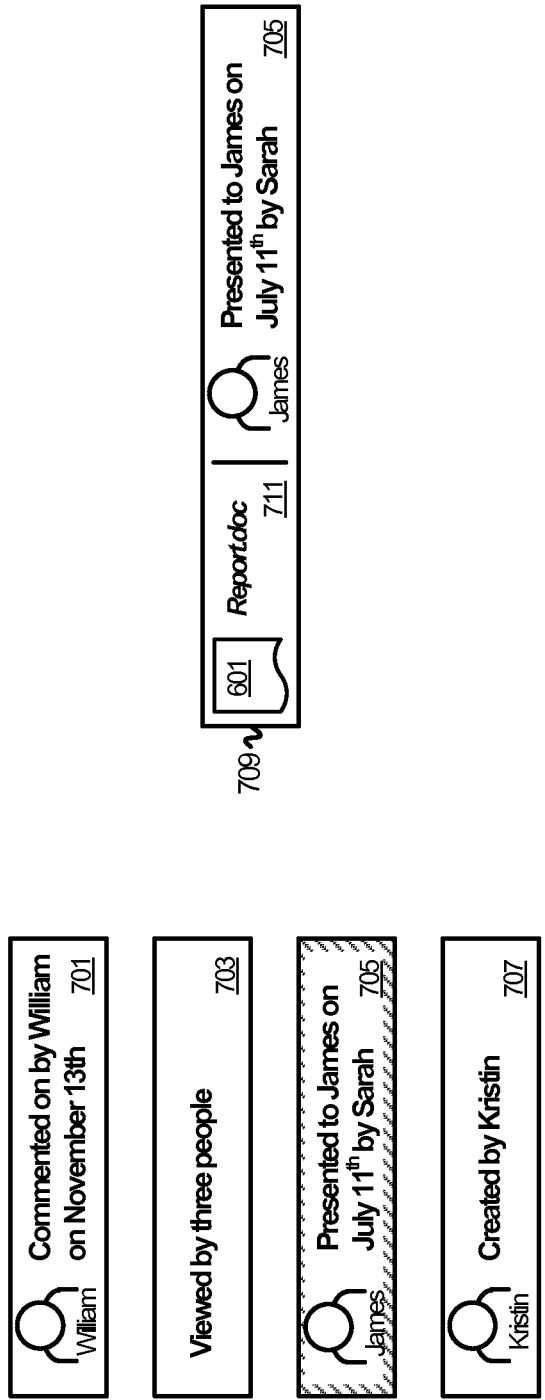
FIG. 7 illustrates candidate labels and a social label in an implementation.
Figure 9:
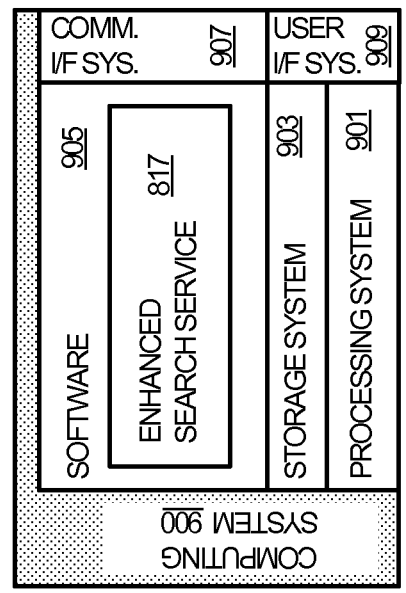
FIG. 9 illustrates a computing system in an implementation.
Figure 8:
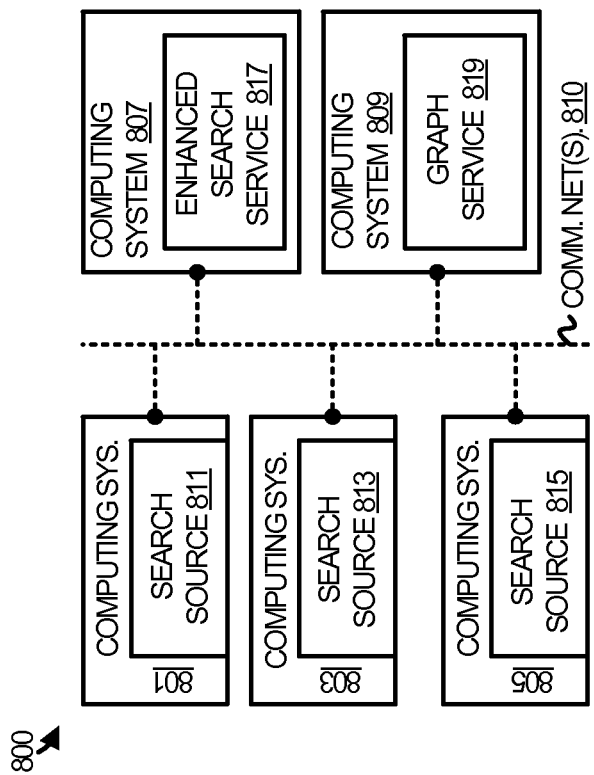
FIG. 8 illustrates a search environment in an implementation.

Referring now to the drawings, FIG. 1 illustrates a visualization of enhanced search results. FIG. 2 illustrates an operational scenario involving an enhanced search service that employs a social label process illustrated in FIG. 3. FIG. 4 illustrates another operational scenario involving an enhanced search service and FIG. 5 illustrates another social label process. FIG. 6 illustrates a visualization of various relationships between a document and enterprise users. FIG. 7 illustrates several visualizations of a search result that includes the document in FIG. 6. FIG. 8 illustrates a computing environment in which an enhanced search service may be provided. FIG. 9 illustrates a computing system representative of those suitable for implementing an enhanced search service, such as those illustrated in FIG. 2 and FIG. 4.

Turning to FIG. 1, a visualization 100 of enhanced search results 101 is illustrated. Enhanced search results 101 are representative of search results that may be returned by an enhanced search service employing a social label process in response to a search query. The search query may be initiated by any query source capable of communicating with an enhanced search service. Examples of the query source include computing hardware, software, and any combination or variation thereof. For instance, the query source may be a web page in a browser, a search tool included in an email client, a search tool in a productivity application, a desktop search application, a search tool included in an operating system, a webpage with an embedded search query, or any other search interface to any kind of search engine. In some cases, the search query may be explicitly initiated by user interaction, such as when a user enters a query string into a search box. However, the search query may also be triggered implicitly, such as when a productivity application automatically or programmatically initiates a search for relevant documents, or for any other reason.

Enhanced search results 101 include search result 103, search result 105, and search result 107. Each of the search results identifies one item of various items returned by a search engine, as well as a social label corresponding to each item. Other types of content items in place of or in addition to documents are possible, such as photos, web pages, contacts, or any other type of item that can be identified in search results.

In particular, search result 103 identifies document 113 and a social label 123. Social label 123 includes social information representative of how document 113 relates to a user associated with the search. In this case, document 113, which is named alpha.doc, is identified as having been presented to the user by another person or people. Search result 105 includes document 115 (echo.doc) and social label 125. Social label 125 expresses that document 115 was viewed by another person or people associated with the user. Search result 107 includes document 115 (kilo.doc) and social label 127. Social label 125 includes social information that expresses that document 117 was modified recently by a person or people associated with the user.

Enhanced search results 101 may be presented to the user conducting the search in response to a search query. The social labels 123, 125, and 127 accompanying the documents 113, 115, and 117 in the search results 103, 105, and 107, serve to inform the user about how each item in the enhanced search results 101 relate to the user. For instance, social label 123 informs the user that document 113 was presented to her, social label 125 informs the user that document 115 was viewed by another person, and social label 127 informs the user that document 117 was modified recently by another person. This information may assist the user with navigating the enhanced search results 101 as how an item relates socially to the user may help distinguish one item over another.

FIG. 2 illustrates an operational scenario 200 in which a query source 201 communicates with an enhanced search service 203 to obtain enhanced search results. Enhanced search service 203 employs social label process 300, described in more detail with respect to FIG. 3, to generate the enhanced search results.

In operation, query source 201 communicates a search query to enhanced search service 203. Query source 201 is representative of any source from which a search query may be initiated and to which search results may be returned. Query source 201 may be implemented in hardware, in software, or in some combination thereof. Examples of query source 201 include, but are not limited to, email applications, productivity applications, gaming applications, browser applications, operating system applications, social network applications, and any other suitable application, variation, or combination thereof. Such applications may be provisioned and delivered as locally installed and executed applications, browser-based applications, streamlining applications, or in some other manner. In addition, such applications may be experienced on any of a variety of computing systems, such as desktop, laptop, tablet, and notebook computers, smart phones, gaming machines, or any other physical or virtual system, variation, or combination thereof.

In response to the search query, enhanced search service 203 searches information repository 205 to identify documents or other items relevant to the search query. Enhanced search service 203 is representative of any service capable of receiving search queries and returning enhanced search results. Enhanced search service 203 may be a stand-alone search service or may be integrated with other services. Examples of enhanced search service include, but are not limited to, Internet search services, enterprise search services, desktop search services, file system search services, email search services, image search services, or any other suitable search service, variation of service, or combination thereof. Examples of other services with which enhanced search service 203 may be integrated include, but are not limited to, email services, productivity application services, gaming services, social network services, or any other service, variation, or combination thereof.

Enhanced search service 203 may search information repository 205 using any criteria, algorithm, or other such technology to identify relevant documents, emails, contacts, images, or other content items. A wide variety of search techniques are possible and may be considered within the scope of the present disclosure. Information repository 205 is representative of any collection of searchable information, such as a collection of documents, emails, images, web pages, blog posts, text messages, or the like. It may be appreciated that information repository 205 may include other information, such as an index or a graph, to facilitate a search of the content items included therein. Information repository 205 may be a stand-alone repository dedicated to enhanced search service 203 or it may be implemented in an integrated manner with another service or services. Examples of information repository 205 include, but are not limited to, an email mailbox, an Internet search index, an enterprise information storage facility, a document storage facility, an information backup facility, or any other suitable collection of searchable information. Information repository 205 may be implemented on any physical or virtual computing system or collection of computing systems, as well as on any variation or combination thereof.

Upon identifying a set of relevant documents or other content items, enhanced search service 203 employs social label process 300, discussed below with respect to FIG. 3, to identify a social label for each of the set of relevant documents. Enhanced search service 203 returns search results to query source 201 that are indicative of the relevant documents and the social labels associated therewith. Query source 201 may then display the search results to a user associated with the search such that the user can view, navigate, and potentially select one of the documents or other content items from the results. As mentioned above, the social labels included with the search results may assist the user in distinguishing one item form another, thereby enhancing the search experience.

Social label process 300, illustrated in FIG. 3, is representative of any process that enhanced search service 203 may employ to determine which social labels to associate and return with various search items in a set of search results. In operation, documents or other content items are identified within the context of a search process employed by enhanced search service 203 in response to a search query (step 301). For each document (or other type of item) that is identified, one or more candidate labels associated with each document are identified that represent the various ways in which each document may related to the user associated with the search (step 303).

In a brief illustration, a document that is returned by a search process may be related to the user in multiple ways. For instance, a person associated with the user may have recently presented the document to the user, while another person may have recently viewed the document. As such, two candidate labels may be generated that correspond to both relationships. It may be appreciated that a variety of relationships are possible, and thus so are a variety of candidate labels, and the scope of the present disclosure is not restricted to just those disclosed herein. The two candidate labels are then evaluated to determine which one to put forth as the social label for the document. The candidate labels may be evaluated based on any suitable criteria, such as the recentness of the relationships associated with each candidate label, a weight given to each type of relationship, a frequency of the relationship, and so on. In some examples, the strength of a relationship may be considered when evaluating each of the candidate labels. The strength of a social link between a person represented in a candidate label and the user associated with the search may be considered. For instance, one candidate label representative how one's manager relates to a document may be chosen as the social label for the document over another candidate label representative of how one's distant peer relates to the document. In another scenario, one candidate label representative how one's close relative relates to a document may be chosen as the social label for the document over another candidate label representative of how one's distant relative relates to the document. In any case, a social label is then selected from the candidate labels based on the evaluation (step 305).

This analysis and evaluation may be carried out for each document that is returned as part of the search, at the end of which a set of documents and a set of corresponding social labels for the documents are assembled. Search results indicative of the documents and their social labels are returned to query source 201 for consideration by the user. In some scenarios, the actual documents or other content items may be returned as part of the search results. However, in many implementations merely an indication of the documents will be returned. For example, a link to each document, an icon representative of each document, or some other indication of each document will be returned. The social labels as identified in the search results may include social information that describes how each document is related to the user. Other types of descriptive data may also be included, such as images of people, color coding, and the like.

FIG. 4 illustrates another operational scenario 400 in an implementation. In operational scenario 400, query source 401 communicates a search query to enhanced search service 402. Enhanced search service 402 includes a service interface 403, a search engine 405, a social label engine 409, and a results integrator 411. Information repository 407 is illustrated as external to enhanced search service 402, although it may be integrated with enhanced search service 402 in some implementations. In addition, graph service 415 and graph 417 are illustrated as external to enhanced search service 402, although they too could be integrated with it in some implementations.

Service interface 403 receives the search query from query source 401 and communicates it to search engine 405 for processing. Query source 401 is representative of any source from which a search query may be initiated and to which search results may be returned. Query source 401 may be implemented in hardware, in software, or in some combination thereof. Service interface 403 is representative of any interface to search engine 405 capable of receiving search queries, communicating them to search engine 405, and communicating enhanced search results to query source 401. Service interface 403 may be a stand-alone element or may be integrated with other elements of enhanced search service 402. In addition, service interface 403 may be implemented in hardware, in software, or in some variation or combination thereof.

Search engine 405 searches information repository 407 for any information items that may be relevant to the search query. Search engine 405 is representative of any search engine capable of searching information repository 407. Examples include Internet search engines, email search engines, document search engines, desktop search engines, file system search engines, social network search engines, or any other type of search facility, variation, or combination thereof. Search engine 405 may be implemented in hardware, software, or any variation or combination thereof.

Information repository 407 is representative of any collection of information that may be searched by search engine 405. Information repository 407 may include various documents, photos, contacts, emails, or other content items. Information repository 407 may also include an index to the items, although search engine 405 may maintain an index independently. A variety of information repositories 407 are possible and may be considered within the scope of the present disclosure.

In this scenario, it is assumed for exemplary purposes that search engine 405 identifies documents in information repository 407 that satisfy the search query. Search engine 405 identifies the documents to results integrator 411 such that the documents, or an indication thereof, may be included in enhanced search results.

Social label engine 409 is also made aware of which documents were found to be relevant to the search query. Social label engine 409 is representative of any service capable of identifying social labels for documents found to be relevant to a search query. Social label engine 409 may be implemented in hardware, in software, or in some variation or combination thereof.

While illustrated as coming from information repository 407, it may be search engine 405 or results integrator 411 that communicates with social label engine 409 to identify the relevant search results. In any case, social label engine 409 employs social label process 500, discussed below with respect to FIG. 5, to identify social labels for each of the relevant documents. As part of this process, social label engine 409 considers relationships that are monitored by graph service 415 and maintained in graph 417. The relationships may be between, for example, the relevant documents and various users that are also related to the user associated with the search.

In particular, graph service 415 monitors information repository 407 or services associated with for interactions with the various documents and other content items stored therein. For example, graph service 415 can monitor a document for when a user views, modifies, shares, or presents the document. The various interactions with the various documents on behalf of users may be considered events that are represented in graph 417.

Graph 417 includes nodes and edges representative of the documents, people, and relationships between them that are created when events occur. For example, graph 417 may include a node representative of a document and several other nodes representative of various people in an enterprise. The edges between them would then represent the various actions that the people may take with respect to the document. Graph service 415 may be implemented in a variety of ways that may be considered within the scope of the present disclosure. In other words, how graph service 415 operates and the structure or nature of graph 417 is not intended to limit the scope of the present disclosure.

Having identified a social label for each of the relevant documents, social label engine 409 communicates the social labels to results integrator 411. Results integrator 411 generates search results indicative of the relevant documents and the social labels associated with the relevant documents. Results integrator 411 is representative of any element or collection of elements capable of integrating documents identified by a search with corresponding social labels to generate enhanced search results. Results integrator 411 may be implemented in hardware, in software, or in some variation or combination thereof.

Results integrator 411 communicates the search results, which includes at least an indication of the documents and the social labels, to service interface 403. Service interface 403 then communicates the search results to query source 401. Query source 401 may then present the enhanced search results or otherwise process them such that the user associated with the search may consider the enhanced results.

FIG. 5 illustrates social label process 500 that may be employed by social label engine 409 to identify social labels for the various documents found to be relevant to a search query. In operation, social label engine 409 identifies the relationship or relationships that may exist between the relevant documents and the user associated with the search (step 501). Social label engine 409 may accomplish this by querying graph 417 for any edges that relate a given document in the set of relevant documents to the user by way of other users linked to the user, but also possibly by a direct relationship. This step is repeated for each document in the set such that one or more relationships are returned for each document.

Next, social label engine 409 determines for each document in the set of relevant documents which of the relationships relate to which of a pool of candidate labels (step 503). In an example, for a document that returned just one relationship, just one candidate label will be identified. However, for another document in the set that return two or more relationships, two or more candidate labels may be identified. In some scenarios, the number of candidate labels may match the number of relationships found for a document, while in other scenarios the number of candidate labels may not match the number of relationships. For example, a given document may return four different relationships, two of which are the same kind of relationship. In such a scenario, social label engine 409 would identify three distinct candidate labels from which to select the social label.

Having identified the candidate social labels, social label engine 409 evaluates each of the candidate social labels based on the relationship or relationships associated therewith (step 505). This may include, for example, assessing the age or freshness of a given relationship. This may be accomplished by time-stamping each edge in graph 417 such that the age of the corresponding relationships can be ascertained. In another example, the popularity of a given candidate label may be assessed. For example, a candidate label that has several relationships associated with it may be given a greater weight than another candidate label that has relatively fewer relationships associated with it. Other criteria include the identity of the other person or people associated with a given relationship. In some examples, the strength of a social link between a person represented in a candidate label and the user associated with the search may be considered, such as when any candidate label corresponding to a relationship associated with a high ranking person may be given priority over a candidate label associated via a relationship with a relatively lower ranking person. Many other criteria for evaluating the candidate labels are possible and may be considered within the scope of the present disclosure.

The social label for each document in the set of relevant documents is selected from the candidate labels for each document based on the evaluation discussed above (step 507). A scoring process or some other technique may be used to weight each candidate label in the evaluations. The candidate label having the highest score may then be used as the social label for a document. In some implementations it may be possible to use multiple social labels for a single document, although it is assumed for the sake of clarity that a single social label is selected for each individual document.

FIG. 6 illustrates a visualization 600 of various relationships that may be established between a document 601 and users 611, 612, 613, 614, 615, 616, 617, and 618 in an enterprise. The relationships depicted in visualization 600 may be captured by a graph service, such as graph service 415, as events occur within an enterprise. An enterprise graph may be maintained by the graph service in which the events may be stored or otherwise reflected. A social label engine, such as social label engine 409, may access the graph to identify relationships for documents in a set of documents returned by a search engine. Candidate labels may be derived from and evaluated based on the relationships in order to select a social label for each of the relevant documents.

Document 601 is representative of any type of document with respect to which users may perform actions and otherwise interact. Examples of document 601 include, but are not limited to, word processing documents, spreadsheets and workbooks, drawings, and presentations, as well as any other type of document. While visualization 600 makes reference to document 601, it may be appreciated that such a visualization may apply as well to other types of content items, such as photos, music files, video files, blog posts, text messages, images, and contacts, as well as any other type of item with which relationships may be established by virtue of user interactions.

In visualization 600, document 601 has been interacted with in a variety ways by a variety of people. In particular, user 611 has viewed document 601. User 612 has viewed document 601 twice and presented it once. User 613 has presented document 601 and user 614 has modified it. User 615 has presented and viewed document 601. User 616 commented on document 601 and user 617 created it. Lastly, user 618 both modified and commented on document 601.

As mentioned, the relationships visualized in FIG. 6 may be stored in a graph and can be used by a social label engine to generate candidate labels and ultimately a social label for document 601. FIG. 7 illustrates several exemplary candidate labels that may be generated with respect to document 601. The candidate labels may then be evaluated to pick a social label for document 601.

In candidate label 701, social information included therein describes how the document relates to the user that initiated the search. In particular, candidate label expresses that document 601 was commented on by William on November 13$^{th}$. Candidate label 703 expresses that document 601 was viewed by three people. Candidate label 705 expresses that document 601 was presented to James by Sarah on July 11$^{th}$. Candidate label 708 expresses that document 601 was created by Kristin. Other candidate labels in addition to or in place of those disclosed herein are possible and may be considered within the scope of the disclosure.

It may be appreciated from candidate labels 701, 703, 705, and 707 that a wide variety of candidate labels are possible and may be considered within the scope of the present disclosure. In addition, a wide variety of social information may be presented within the candidate labels. The social label may be selected based on a wide variety of weighting criteria and other factors that are evaluated when selecting a social label. It is assumed for exemplary purposes in FIG. 7 that candidate label 705 is selected to be the social label for 601 in a set of search results returned to a user.

Accordingly, FIG. 7 includes an example of an enhanced search result 709. Enhanced search result 709 includes a content portion 711 that includes an icon representative of document 601 and its name, "Report.doc." Enhanced search result 709 also includes social label 705. Thus, it may be evident in from enhanced search result 709 that document 601 was presented to James by Sarah on July 11. This social information may be useful to the user associated with the search when navigating through various search results. In the aggregate, if others of the search results are also enhanced by way of a social label, the user is able to compare their relative social information, which may further assist with navigating what can be an overwhelming volume of search results.

FIG. 8 illustrates a search environment 800 that is representative of any environment in which the various implementations of an enhanced search service discussed herein may be carried out. Search environment 800 includes communication network 810 over which computing systems 801, 803, and 805 may communicate with computing system 807 and with computing system 809. Computing system 807 and computing system 809 may also communicate with each other over communication network 810 or over some other communication link or collection of links.

Examples of computing systems 801, 803, and 805 include, but are not limited to, desktop computers, work stations, laptop computers, notebook computers, tablet computers, mobile phones, personal digital assistances, media devices, gaming devices, and any other physical or virtual computing machine or combinations and variations thereof. Computing systems 801, 803, and 805 may be capable of implementing search sources 811, 813, and 815 respectively. Search sources 811, 813, and 815 may each be representative of any hardware, software, or combinations thereof capable of providing an interface to enhanced search service 817 such that users can interact with computing systems 801, 803, and 805 to perform searches. Examples of search sources 811, 813, and 815 include, but are not limited to, a search engine web page, a search engine tool integrated into another application (such as an email client or productivity application), a desktop search tool, a mobile search tool, or any other suitable search source.

Computing system 807 may be any computing system or collection of computing systems capable of implementing enhanced search service 817, which is representative of any enhanced search service, including enhanced search services 203 and 402. Computing system 809 may also be any computing system or collection of systems capable of implementing graph service 819. Graph service 819 is optional and may be excluded in some implementations. Examples of computing system 807 and computing system 809 include server computers, cloud computing platforms, data center equipment, physical or virtual computing machines, and any variation or combination thereof.

Computing system 900 is representative of any computing system suitable for implementing any of computing systems 801, 803, 805, 807, and 809, although the discussion below makes specific reference to computing system 807 for purposes of clarity. In addition, while enterprise search service 817 is illustrated as implemented separately from a search interface, or remotely from the devices with which a user may interact, it may be appreciated that in some implementations all or portions of enterprise search service 817 may be implemented locally with respect to a user, such as in a co-located fashion on a device operated by a user, of which computing systems 801, 803, and 805 are representative.

In operation, computing systems 801, 803, and 805 may communicate with computing system 807 to perform information searches. This may include communicating search requests to and receiving search replies from enhanced search service 817. Enhanced search service 817 handles the search requests in accordance with the various implementations described herein for enhanced search services 203 and 402.

In addition, computing systems 801, 803, and 805 may communicate from time to time with computing system 809 in the context of facilitating graph service 819. Computing system 801, 803, and 805 may communicate with other services that may be separate from enhanced search service 817 or that may include enhanced search service 817 therein, such as such as productivity application services, file storage services, email services, chat services, blog services, voice and video calling services, or any other type of application service. Some or all of the application services may be implemented locally or in part with respect to computing systems 801, 803, and 805. Within the context of these services, events may occur that can be captured and from which an enterprise graph or graphs may be constructed. Graph service 819 may capture the events and construct the graph, although in some implementations these tasks may be allocated to another service or services.

Communication between any of the elements contemplated in FIG. 8 may occur in accordance with various communication protocols, such as the Internet protocol (IP, IPv4, IPv6, etc.), the transfer control protocol (TCP), and the user datagram protocol (UDP), as well as any other suitable communication protocol, variation, or combination thereof. Communication network 810 may be representative of a network or collection of networks over which the elements contemplated in FIG. 8 may exchange information, such as an intranet, the Internet, a local area network, a wide area network, a wireless network, a wired network, a virtual network, a software defined network, or any combination or variation thereof. Communication network 810 may include connections, devices, and communication media, such as metal, glass, air, or any other suitable communication media over which information may be exchanged. The aforementioned communication media, networks, connections, protocols, and devices are well known and need not be discussed at length here.

In any of the aforementioned examples in which information is exchanged at least between search sources 811, 813, and 815 and enhanced search service 817, the exchange of information may occur in accordance with any of a variety of protocols, including FTP (file transfer protocol), HTTP (hypertext transfer protocol), REST (representational state transfer), Web Socket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Referring now to FIG. 9, computing system 900 is representative of any computing system or collection of systems suitable for implementing all or portions of enhanced search service 817 and optionally any of the other operational scenarios and examples described herein. In the aggregate, a collection of systems such as computing system 900 may provide an enhanced search service on a large scale to many users. For example, computing system 900 may be representative of any system used in a physical or virtual data center or collection of data centers to provide an enhanced search service at a very large scale to millions of users or at even greater scale. However, smaller scale implementations at the enterprise, university, school, family, or individual size, for example, are also possible and may be considered within the scope of this disclosure.

Computing system 900 may be implemented as a single apparatus, system, or device or may be implemented in a distributed manner as multiple apparatuses, systems, or devices. Examples of computing system 900 include server computers, rack servers, blade servers, cloud computing platforms, and data center equipment, as well as any other type of physical or virtual server machine, and any variation or combination thereof. While typically implemented in a server or collection of servers, enhanced search service 817 may also be implemented all or in part on desktop computers, laptop computers, tablet computers, notebook computers, mobile computing devices, cell phones, media devices, and gaming devices, as well as any other type of physical or virtual computing machine and any combination or variation thereof, of which computing system 900 may also be representative.

Computing system 900 includes, but is not limited to, processing system 901, storage system 903, software 905, communication interface system 907, and user interface system 909, which is optional. Processing system 901 is operatively coupled with storage system 903, communication interface system 907, and user interface system 909. Processing system 901 loads and executes software 905 from storage system 903. When executed by processing system 901, software 905 directs processing system 901 to operate as described herein for enhanced search service 203, enhanced search service 402, social label process 300, social label process 500, and any of the operational scenarios and examples disclosed herein. Computing system 900 may optionally include additional devices or functionality not discussed for purposes of brevity.

Referring still to FIG. 9, processing system 901 may comprise a microprocessor and other circuitry that retrieves and executes software 905 from storage system 903. Processing system 901 may be implemented within a single processing device but may also be distributed across multiple processing devices or sub-systems that cooperate in executing program instructions. Examples of processing system 901 include general purpose central processing units, application specific processors, and logic devices, as well as any other type of processing device, combinations, or variations thereof.

Storage system 903 may comprise any computer readable storage media readable by processing system 901 and capable of storing software 905. Storage system 903 may include volatile and nonvolatile, removable and non-removable media implemented in any method or technology for storage of information, such as computer readable program instructions, data structures, program modules, or other data. Examples of storage media include random access memory, read only memory, solid state memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 903 may also include computer readable communication media over which software 905 may be communicated internally or externally. Storage system 903 may be implemented as a single storage device but may also be implemented across multiple storage devices or sub-systems co-located or distributed relative to each other. Storage system 903 may comprise additional elements, such as a controller, capable of communicating with processing system 901 or possibly other systems.

Software 905 may be implemented in program instructions and among other functions may, when executed by processing system 901, direct processing system 901 to operate as described herein for social label process 300 or social label process 500 and their variations, and optionally as described with respect to the various operational scenarios and examples disclosed herein. In particular, the program instructions may include various components or modules that cooperate or otherwise interact to carry out social label process 300 or social label process 500. The various components or modules may be embodied in compiled or interpreted instructions or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software or other application software. Software 905 may also comprise firmware or some other form of machine-readable processing instructions executable by processing system 901.

In general, software 905 may, when loaded into processing system 901 and executed, transform a suitable apparatus, system, or device (of which computing system 900 is representative) overall from a general-purpose computing system into a special-purpose computing system customized to facilitate enhanced search services as described herein for each implementation. Indeed, encoding software 905 on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary storage, as well as other factors.

For example, if the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

Referring again to FIG. 2 and FIG. 4, through the operation of a computing system or systems of which computing system 900 is representative, transformations may be performed with respect to search results identified in response to a search query. As an example, a set of search results may include various documents. The set of search results may be modified from a first state in which there are no associated social labels, to a second state in which social labels are identified and included with the search results. When presented to a user, a visualization of the search results is enhanced by the social labels.

It should be understood that computing system 900 is generally intended to represent a computing system or systems on which software 905 may be deployed and executed in order to implement enhanced search service 203 or enhanced search service 402, and optionally all or portions of the various operational scenarios and examples described herein. However, computing system 900 may also be suitable as any computing system on which software 905 may be staged and from where software 905 may be distributed, transported, downloaded, or otherwise provided to yet another computing system for deployment and execution, or yet additional distribution.

Communication interface system 907 may include communication connections and devices that allow for communication with other computing systems (not shown) over a communication network or collection of networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 900 and any other computing system (not shown) may occur over a communication network or networks and in accordance with various communication protocols, combinations of protocols, or variations thereof. Examples of communication networks over which computing system 900 may exchange information with other computing systems include intranets, the Internet, local area networks, wide area networks, wireless networks, wired networks, virtual networks, software defined networks, or any combination or variation thereof. The aforementioned communication networks and protocols are well known and need not be discussed at length here.

When applicable, user interface system 909 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 909. In some cases, the input and output devices may be combined in a single device, such as a display capable of displaying images and receiving touch gestures. The aforementioned user input and output devices are well known in the art and need not be discussed at length here.

User interface system 909 may also include associated user interface software executable by processing system 901 in support of the various user input and output devices discussed above. Separately or in conjunction with each other and other hardware and software elements, the user interface software and user interface devices may support a graphical user interface, a natural user interface, or any other type of user interface. For example, a search interface to an enhanced search service may be presented through user interface system 909. In another example, search results returned from an enhanced search service that include social labels, may be presented through user interface system 909.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method for facilitating enhanced document search comprising:
    receiving a search query from a first user;
    identifying a plurality of documents in response to the search query;
    for each document,
        determining one or more relationships between the document and (i) the first user and (ii) at least one second user who interacted with the document;
        comparing the one or more relationships defined by the edges to a plurality of candidate social labels to identify candidate social labels specifying relationships matching the one or more relationships, wherein each identified candidate social label specifies: at least one relationship between the document and (i) the first user and (ii) at least one second user, and an action taken with respect to the document;
        scoring each identified candidate social label based on a representative trait shared in common by each of the candidate social labels, the representative trait including one or more of a social label freshness, a social label popularity, or a strength of a relationship specified by the identified candidate social label;
        selecting, from among the identified candidate social labels, a social label based on the scoring; and
        providing an indication of each of the plurality of documents, in association with the social label selected for the document, for presentation.

2. The method of claim wherein the determining comprises identifying the one or more relationships between the document and a plurality of second users based on a graph that includes one or more edges, each edge defining a respective relationship in the one or more relationships.

3. The method of claim 2, wherein:
    the graph comprises a plurality of nodes representative of the document and the plurality of second users; and wherein
    each edge represents an action taken with respect to the document by a respective second user in the plurality of second users.

4. The method of claim 3, wherein:
    each relationship is representative of a different action taken with respect to the document; and
    each action comprises any one of a plurality of possible actions including at least presenting the document, sharing the document, creating the document, modifying the document, commenting on the document, viewing the document, following the document, or liking the document.

5. The method of claim 4, wherein:
    the plurality of candidate social labels correspond to the plurality of possible actions; and
    the identified candidate social labels for the document comprise social information that represents at least in part how the document relates socially to the first user in terms of the action taken with respect to the document by at least one of the plurality of second users.

6. The method of claim 5, wherein each candidate social label in the plurality of candidate social labels comprises a presented-by label representative of any of the plurality of second users having presented the document, a shared-by label representative of any of the plurality of second users having shared the document, a created-by label representative of any of the plurality of second users having created the document, a modified-by label representative of any of the plurality of second users having modified the document, a commented-on-by label representative of any of the plurality of second users having commented on the document, a viewed-by label representative of at least any of the plurality of second users having viewed the document, a followed-by label representative of at least any of the plurality of second users having followed the document, or a liked-by label representative of any of the plurality of second users having liked the document.

7. The method of claim 1, wherein the representative trait is derived at least in part from a characteristic of the one or more relationships.

8. The method of claim 1, wherein the strength of the relationship prioritizes a higher ranking second user over a lower ranking second user.

9. The method of claim 8, wherein each document is one of a word processing document, a spreadsheet, a workbook, a drawing, or a presentation document.

10. The method of claim 1, wherein the strength of the relationship comprises a strength of a social link between the identified candidate social label and the first user.

11. One or more computer readable storage media having program instructions stored thereon for facilitating enhanced document search that, when executed by a computing system, directs the computing system to at least:
receive a search query from a first user;
identify a plurality of documents in response to the search query;
for each document,
determine one or more relationships between the document and (i) the first user and (ii) at least one second user who interacted with the document;
compare the one or more relationships to a plurality of candidate social labels to identify candidate social labels specifying relationships matching the one or more relationships, wherein each identified candidate social label specifies: at least one relationship between the document and (i) the first user and (ii) at least one second user, and an interaction with the document;
score each identified candidate social label based on a representative trait shared in common by each of the candidate social labels;
select, from among the identified candidate social labels, a social label based on scoring of each identified candidate social label; and
cause a presentation of search results to the search query by causing a presentation of an indication of each document in the search results in association with the social label selected for the document,
wherein each document is one of a word processing document, a spreadsheet, a workbook, a drawing, or a presentation document.

12. The one or more computer readable storage media of claim 11, wherein determine the one or more relationships comprises identifying the one or more relationships between the document and a plurality of second users.

13. The one or more computer readable storage media of claim 12, wherein the one or more relationships are identified based on a graph that comprises:
a plurality of nodes representative of the document and the plurality of second users; and
a plurality of edges representative of a plurality of interactions taken with respect to the document by the plurality of second users.

14. The one or more computer readable storage media of claim 13, wherein each identified candidate social label for the document comprises social information that represents at least in part how the document relates socially to the first user in terms of an interaction taken with respect to the document by at least one second user.

15. The one or more computer readable storage media of claim 12, wherein the representative trait is derived at least in part from a characteristic of the one or more relationships.

16. The one or more computer readable storage media of claim 15, wherein scoring of each identified candidate social label includes a weighting of at least one relationship.

17. The one or more computer readable storage media of claim 16, wherein the representative trait comprises one of a freshness of each of the plurality of candidate social labels or a popularity of each of the plurality of candidate social labels.

18. An enhanced search service comprising:
a search engine that identifies a plurality of items in response to a search query;
a social label engine that, for each item,
determines one or more relationships between the item and (i) a first user associated with the search query and (ii) at least one second user who interacted with the item;
compares the one or more relationships to a plurality of candidate social labels to identify candidate social labels specifying a relationship matching each of the one or more relationships, wherein each identified candidate social label specifies at least one relationship between the item and (i) the first user and (ii) at least one second user, and an action taken with respect to the document;
scores each identified candidate social label based on a representative trait shared in common by each of the candidate social labels, the representative trait including one or more of a freshness of the social label, a popularity of the social label, or a strength of the relationship specified by the identified candidate social label;
selects, from among the identified candidate social labels, a social label based at least in part on scoring of each identified candidate social label; and
a service interface that receives the search query and replies to the search query with search results indicative of at least the plurality of items, each item being in association with the social label selected for the item,
wherein each item is one of a word processing document, a spreadsheet, a workbook, a drawing, or a presentation document.

19. The enhanced search service of claim 18, wherein determination of the one or more relationships is based on a social graph that comprises:
a first node representative of the item;
second nodes representative of the plurality of second users; and a plurality of edges between the first node and at least one of the second nodes, each edge representing an action taken with respect to the item by a respective second user in the plurality of second users.

20. The enhanced search service of claim 19, wherein:
the candidate social labels correspond to the plurality of actions; and
each candidate social label represents at least in part how a corresponding item relates socially to the first user in terms of an action taken with respect to the corresponding item by at least one of the plurality of second users.

* * * * *